May 23, 1950     N. M. WILLIAMS     2,508,849
WHEEL PLAY INDICATOR
Filed Nov. 30, 1945     2 Sheets-Sheet 1
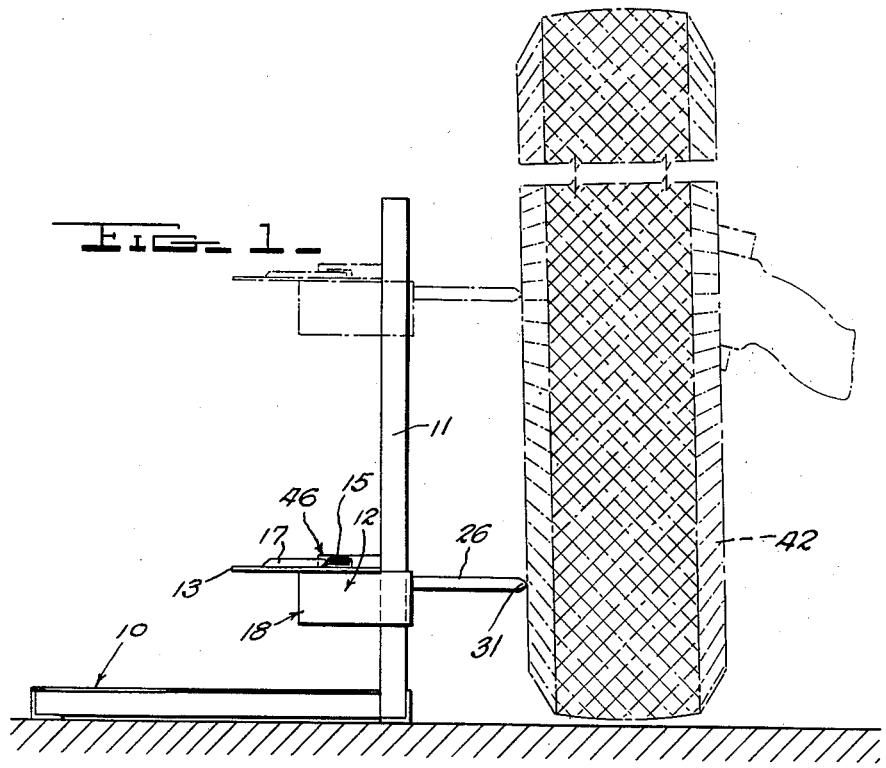
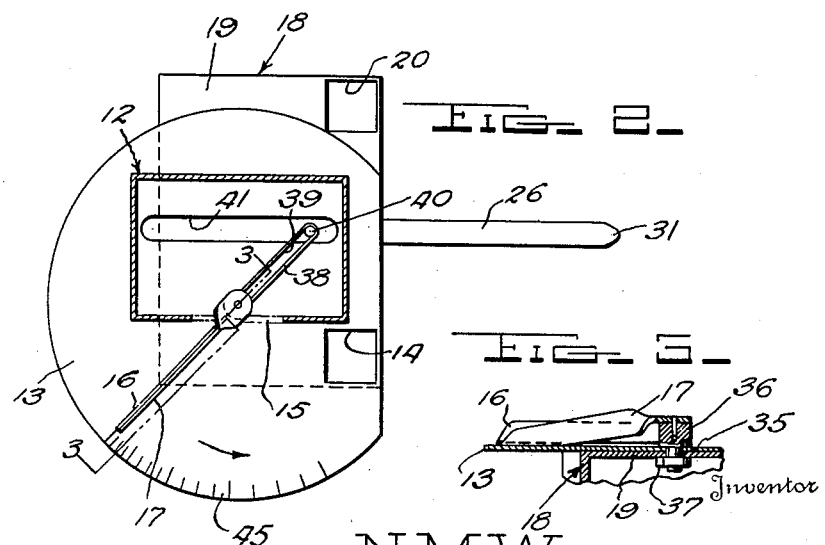
N.M.WILLIAMS May 23, 1950 N. M. WILLIAMS 2,508,849
WHEEL PLAY INDICATOR
Filed Nov. 30, 1945 2 Sheets-Sheet 2
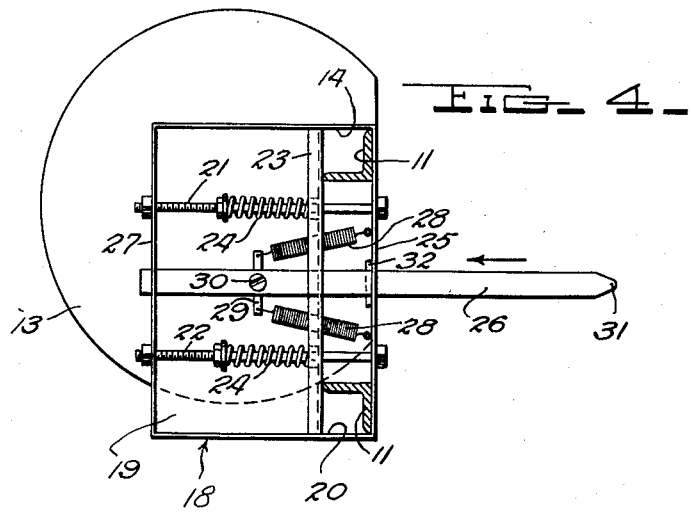
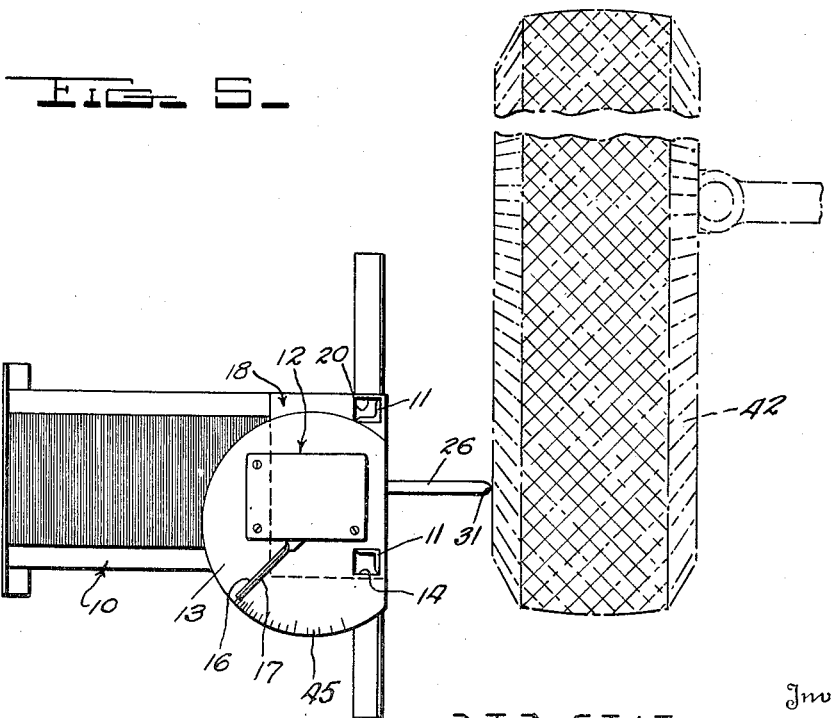
Inventor
N. M. WILLIAMS Patented May 23, 1950

2,508,849

UNITED STATES PATENT OFFICE 2,508,849

WHEEL PLAY INDICATOR

Neville M. Williams, Harrisonburg, Va.

Application November 30, 1945, Serial No. 631,835

1 Claim. (Cl. 33—172)

This invention relates to an indicating apparatus and is more particularly directed to an apparatus for disclosing the degree of play in vehicle wheels.

In those jurisdictions where an inspection of automobiles is required, and particularly where automobile repair shops are assigned to the duty of inspection, an overzealous inspector will exaggerate the defect, because of the lack of simple instrumentalities for indicating the extent of the lost motion, which the customer may read for himself, at the time of the inspection.

It is an object of the present invention to provide a simple and efficient apparatus for determining the amount of play of certain elements of the wheels of an automobile.

Another object of the invention is the provision of a simple apparatus which may be accurately operated by an unskilled person to determine the amount of play in a vehicle wheel due to either loose connections in king bolts or steering arms.

A further object of the invention is the provision of an apparatus for determining the amount of play in vehicle wheels, said apparatus including standards rising from a base with a device adjustably mounted on the standards and having a movable index finger engageable with points on a wheel, said finger being reciprocated when the wheel is rocked because of loose connections associated with the wheel, said finger operating an indicator over a scale, thereby showing the degree of looseness in the wheel.

A still further object of the invention is the provision of a simple and efficient apparatus for disclosing the amount of play in a wheel either because of defective connections in the king bolt or in the steering arms, said apparatus including a reciprocating finger for actuating an arm that moves an indicator over a scale showing the degree of looseness, said indicator remaining in indicating position after the apparatus has been moved away from the wheel.

Other objects of the invention will appear as the following description of a preferred and practical embodiment thereof proceeds.

In the drawings:

Figure 1 is a side view in elevation of the indicating apparatus in operative relation with a wheel for determining the play caused by a loose king pin;

Figure 2 is an enlarged horizontal section of the indicating device per se which has been removed from its support;

Figure 3 is an enlarged fragmentary vertical section, taken along the line 3—3 of Figure 2, and showing a movable arm and indicator;

Figure 4 is a bottom plan view, partly in section, of the indicating device showing the operating parts; and Figure 5 is a top plan view of the indicating apparatus shown applied to a wheel for determining the loose play in the steering arms of automobiles.

Referring more particularly to the drawings, 10 designates a platform or base member which is adapted to be placed on level ground or on the floor of a building and which has a framework of angle iron construction. Spaced standards 11 of angle iron construction rise from the platform and are secured rigidly in any suitable manner to said platform.

A housing generally designated by the numeral 12, is mounted on a plate 13 which has an opening 14 through which is inserted one of a pair of standards 11. The housing has a side opening 15, through which project an arm 16 and an indicator 17, (Figures 2 and 3).

Referring more particularly to Figure 3, it will be seen that a casing 18 has its top 19 secured to the under face of the plate 13. Said top has an opening 20 which receives the other standard 11. Spaced bolts 21 and 22 are secured in the casing in parallel relation to each other. A bar 23 is slidably mounted on the bolts, and springs 24 on said bolts press against the bar and force said bar into frictional engagement with the angle iron standards 11 for maintaining the housing 12, the plate 13 and the casing 18 in adjusted positions vertically along the standards. An outer wall 25 of the casing is in abutting relation with said standards and cooperates with the bar 23 for retaining said casing and associated parts forming the indicating unit per se in adjusted positions.

An index finger or feeler 26 is mounted for reciprocation in the wall 25 and a parallel wall 27 of the casing 18. Coil springs 28 are connected between the wall 25 and the ends of a bar 29 secured by a bolt 30, to the finger 26. The springs return said finger to its normal inoperative position when the free end 31 of said finger is removed from engagement with a tire after the finger had been moved in the direction of the arrow shown in Figure 4. A pin 32, mounted in the finger 26, engages the inner face of the wall 25 and limits the outward movement of said finger.

The arm 16 is pivotally mounted between its ends on bolt 35 passing through the plate 13 and the top 19 of the casing 18. A head 36 on the upper end of the bolt and a nut 37 screwed on the threaded portion of bolt 35 maintains the bolt in position.

The arm 16 has an extension 38 (Figure 2) which has an elongated slot 39 receiving a pin 40, projecting upwardly from the finger 26 through an elongated slot 41 formed in the plate 13. By this construction, reciprocation of the finger 26 by the rocking of a tire 42 will cause said pin 40 to push the extension 38 toward the left, thereby causing the arm to oscillate.

The indicator 17 has its inner end loosely pinned on the head 36 of the bolt 35 and is movable independently of the arm 16, except when said indicator is oscillated by the arm in the direction indicated by the arrow in Figure 2 and over a scale 45. However, when the arm is returned by the springs 28 to its normal inoperative position, the indicator will remain in its indicating position until manually returned.

The plate 13, and the associated housing 12 and the casing 18 are moved as a unit 46 vertically along the standards when the bar 23 is forced away manually from said standards against the tension of the springs 24. When the bar is released, it will frictionally engage said standards and retain the unit in position.

Referring more particularly to Figure 1, it will be seen that when the apparatus is so placed adjacent the tire 42 with the end 31 of the finger in engagement with a side wall of said tire when the tire is in substantially a vertical plane, rocking of the tire along a horizontal axis where there is loose play in the king pin connections will cause the lower end of said tire to move the finger inwardly of the casing 18, thereby rocking the arm 16 and moving the indicator over the scale 45 which is so graduated as to disclose the amount of displacement of the rocked tire from a vertical. If the position of the indicator 17 shows too great a degree of displacement, the proper correction must be made.

Referring to Figure 5, it will be seen that another determination may be made when the tire is rocked along a vertical axis. The apparatus is so positioned relative to the tire 42 that the point 31 of the finger 26 will engage the side wall of said tire at a point approximately in line with the horizontal axis, the unit 46 carrying the indicator 17 being adjusted vertically along the standards 11 for the purpose.

Any loose play in the steering arms will be registered by the indicator 17 on the scale 45. Such registration will determine whether adjustments must be made in the steering arms.

While I have in the above description disclosed what I believe to be a preferred and practical embodiment of the invention, it will be understood to those skilled in the art that the details of construction and the arrangement of parts, as shown, are by way of example and not to be construed as limiting the scope of the invention.

What I claim as my invention is:

Indicating apparatus for determining play in automobile front wheels comprising a platform, spaced guide rods extending upwardly from the front of said platform in a vertical direction, an open bottomed casing having front, top, and back walls and guideways at the front through which said vertical guide rods freely slide, a friction plate mounted within said casing to slide in a back to front direction into contact with said guide rods, spaced parallel bolts fixed in said casing in a plane perpendicular to the plane of said vertical guide rods and passing through apertures in said plate, springs in compression surrounding said bolts bearing against said plate to clamp it against said guide rods, a feeler extending through said casing and beyond said front and back walls, reciprocably slidable through apertures in said walls, said feeler being between said guide rods, springs of equal strength connected to said feeler on opposite sides and to said casing and being symmetrically arranged with respect to said feeler for urging it in a forward direction, a stop on said feeler limiting its forward movement, said casing having on its top wall a scale plate and an index movable responsive to movements of said feeler in operative relation to said scale plate.

NEVILLE M. WILLIAMS.

REFERENCES CITED

The following references are of record in the file of this patent:

UNITED STATES PATENTS

| Number | Name | Date |
| --- | --- | --- |
| 407,903 | Schlatter | July 30, 1889 |
| 1,063,766 | Becker | June 3, 1913 |
| 1,131,253 | Lichtner | Mar. 9, 1915 |
| 1,149,469 | Schilling | Aug. 10, 1915 |
| 1,317,227 | Scusa | Sept. 30, 1919 |
| 2,327,948 | Webster | Aug. 24, 1943 |

FOREIGN PATENTS

| Number | Country | Date |
| --- | --- | --- |
| 494,254 | France | Mar. 26, 1919 |